United States Patent
Yamamoto

(10) Patent No.: US 7,159,933 B2
(45) Date of Patent: *Jan. 9, 2007

(54) CLIP HOUSE STRUCTURE FOR MOUNTING OF AUTOMOTIVE TRIM PARTS

(75) Inventor: Hiroaki Yamamoto, Brookville, OH (US)

(73) Assignee: Green Tokai Co., Ltd., Brookville, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/529,286

(22) PCT Filed: Jul. 30, 2003

(86) PCT No.: PCT/US03/23862

§ 371 (c)(1),
(2), (4) Date: Feb. 3, 2006

(87) PCT Pub. No.: WO2004/028859

PCT Pub. Date: Apr. 8, 2004

(65) Prior Publication Data

US 2006/0145516 A1    Jul. 6, 2006

Related U.S. Application Data

(60) Provisional application No. 60/414,193, filed on Sep. 27, 2002.

(51) Int. Cl.
*B60R 13/02* (2006.01)

(52) U.S. Cl. .................................. 296/209; 296/29
(58) Field of Classification Search ............. 296/181.2, 296/199, 209, 187.12, 203.03, 191, 29, 75, 296/187.05; 293/126; 280/163
See application file for complete search history.

(56) References Cited

U.S. PATENT DOCUMENTS

| 4,911,495 A | 3/1990 | Haga et al. |
| 5,456,957 A * | 10/1995 | Jackson et al. ................ 293/1 |
| 5,514,427 A | 5/1996 | Ellison et al. |
| 5,599,608 A | 2/1997 | Yamamoto et al. |
| 5,609,004 A * | 3/1997 | Kreis .......................... 296/29 |
| 6,171,543 B1 | 1/2001 | Hirose |
| 6,722,730 B1 * | 4/2004 | Lydan et al. ................. 296/191 |
| 6,979,054 B1 * | 12/2005 | Yamamoto et al. .......... 296/209 |
| 7,040,682 B1 * | 5/2006 | Tokumoto et al. .......... 296/209 |
| 2004/0185223 A1 * | 9/2004 | Yamamoto .................... 428/99 |
| 2006/0066139 A1 * | 3/2006 | Futasuhashi ................ 296/209 |

* cited by examiner

*Primary Examiner*—Jason Morrow
(74) *Attorney, Agent, or Firm*—Wegman, Hessler & Vanderburg

(57) ABSTRACT

Rocker panel/clip house combination is shown wherein a first support member of the clip house is connected to the rocker panel at a first junction that is located between the top surface of the part and a depending side surface. The side surface is connected to a part surface at a second juncture or radiused section. A second support member of the clip house is attached to the surface at a location that is laterally spaced from the second juncture.

4 Claims, 2 Drawing Sheets

CLIP HOUSE STRUCTURE FOR MOUNTING OF AUTOMOTIVE TRIM PARTS

CROSS-REFERENCE TO RELATED APPLICATIONS

This application claims the priority filing benefit of International PCT application PCT/US2003/023862 filed Jul. 30, 2003, and published under PCT 21(2) in the English language; and U.S. Provisional Patent Application Ser. No. 60/414,193 filed Sep. 27, 2002.

BACKGROUND OF THE INVENTION

The present invention pertains to molded plastic parts for attachment to a supporting member. More specifically, the present invention relates to clip house mounting structures which provide improved flexural characteristics and structural strength in the corresponding part.

Injection molded plastic parts are commonly used in the automotive industry for side panels, spoilers, dashboards, armrests, wheel covers, filler panels, trim pieces, bumpers, side-sill garnishes, rocker panels and the like. Typically these parts are provided with a painted, or other decorative surface such as by means of film lamination techniques. In such film lamination techniques, a paint film laminate is co-molded over an external show face surface of the plastic part. The film laminate is typically pre-formed, inserted into a mold cavity, and a thermoplastic resin is injected under pressure into the mold cavity against the backside of the laminate. The result is a plastic part having a film laminate co-molded over a plastic substrate. Laminated paint films are detailed in U.S. Pat. No. 5,514,427, the entire disclosure of which is incorporated by reference herein. Techniques for preforming paint film laminates and insert molding film-plastic parts are disclosed in U.S. Pat. No. 5,599,608, the disclosure of which is incorporated herein by reference.

These plastic parts are typically provided with a series of integrally molded attachment means or as they are referred to in the art "clip houses" for securing the part to the given support member. Structural strength of the attachment means is dependent upon many factors including the thickness of the plastic at the intersection of the attachment means with the part to be supported.

One representative mounting structure for an automotive part is shown in U.S. Pat. No. 6,171,543. In this disclosure, a reinforcing rib is interposed between the connection of the clip house structure and the hidden side of the corresponding plastic part. The rib provides the required strength while limiting the thickness of plastic material proximate the show face surfaces of the part.

Some elongated injection molded automobile parts such as a rocker anel or side sill garnish, comprise a top show surface that is connected to a depending side show surface. The side surface is, in turn, connected to a surface that typically is manipulated by the assembly person or robot as the part is attached to the frame. In such structures, it is desirable to enhance the strength and stability of the part especially along the underside portion that will be handled during part assembly.

SUMMARY OF THE INVENTION

The rocker panel or side sill garnish with clip house mounting structure includes a first support member of the clip house that is connected to the plastic automotive part at a first junction located between the top surface of the automotive part and the side surface. Desirably, the top surface extends over the first support member leaving an air space between these members to provide increased flex along the top surface. Most preferably, the first junction and support member are joined along a hollow rib or channel.

Additionally, a second support member of the clip house is attached to the part along the underside portion of the part at a locus that is spaced laterally from the second juncture formed between the side surface and underside portion of the part. This provides stability to the underside portion so that the part can withstand normal forces exerted thereon such as assembly of the part to the automotive frame member.

The invention will be further described in conjunction with the following detailed description and drawings.

DETAILED DESCRIPTION OF THE PREFERRED EMBODIMENT

Figure 1:
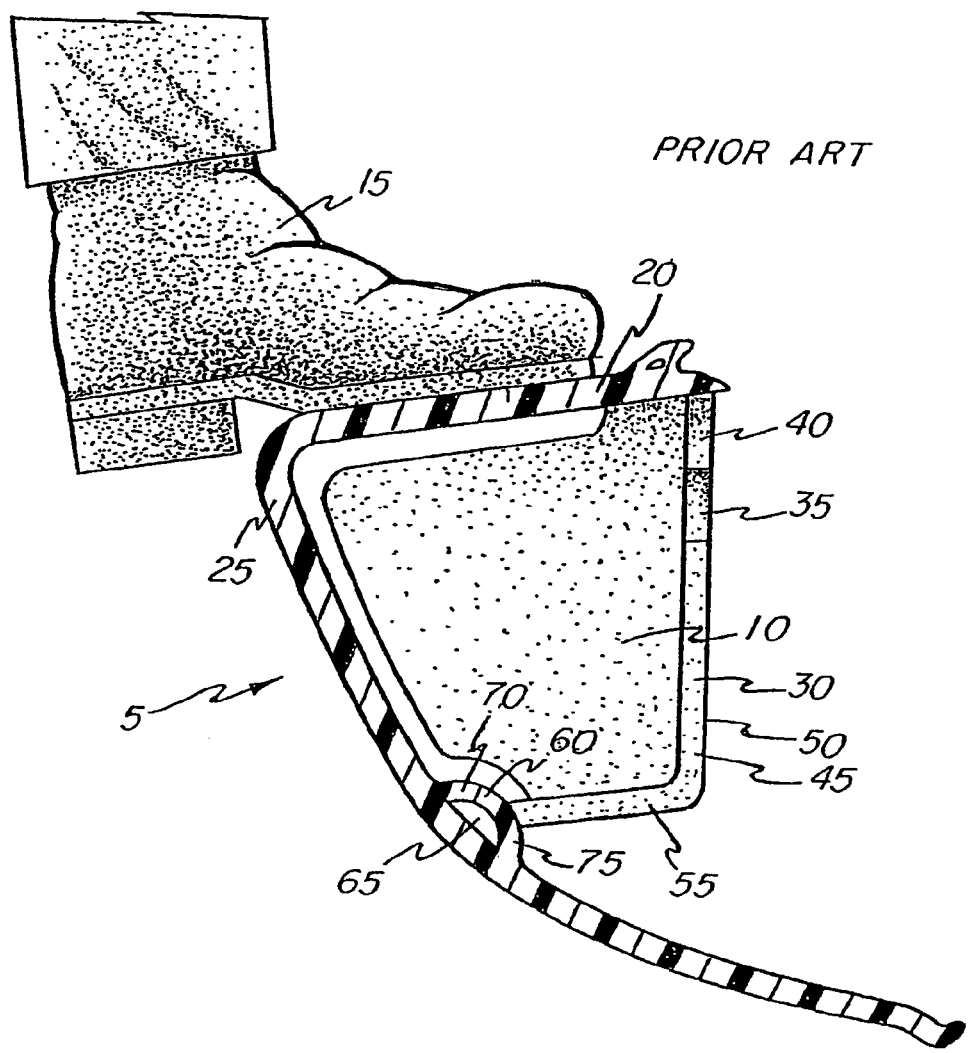
FIG. 1 is a transverse cross-sectional view of a rocker panel in accordance with the prior art.

Referring initially to FIG. 1, there is shown a rocker panel 5 in accordance with the prior art. The rocker panel 5 is shown with a clip house mounting structure 10 connected thereto. Additionally, the rocker panel 5 is shown with the foot 15 of a person positioned as anticipated on top of the top portion 20.

As can be seen from viewing FIG. 1, the clip house mounting structure 10 includes a clip mounting member 30 having a clip receiving means 35, an upper portion 40, and a lower portion 45 presenting a substantially planar clip mounting surface 50. The clip house mounting structure 10 further has a horizontal member 55 extending from the lower portion 45 of the clip mounting member 30 to a reinforcing rib 60. The reinforcing rib 60 is connected to a curved side panel 25 or skirt with foot portions 70,75. The foot portions 70,75 cooperate with a portion of the side panel to define a channel 65.

Figure 2:
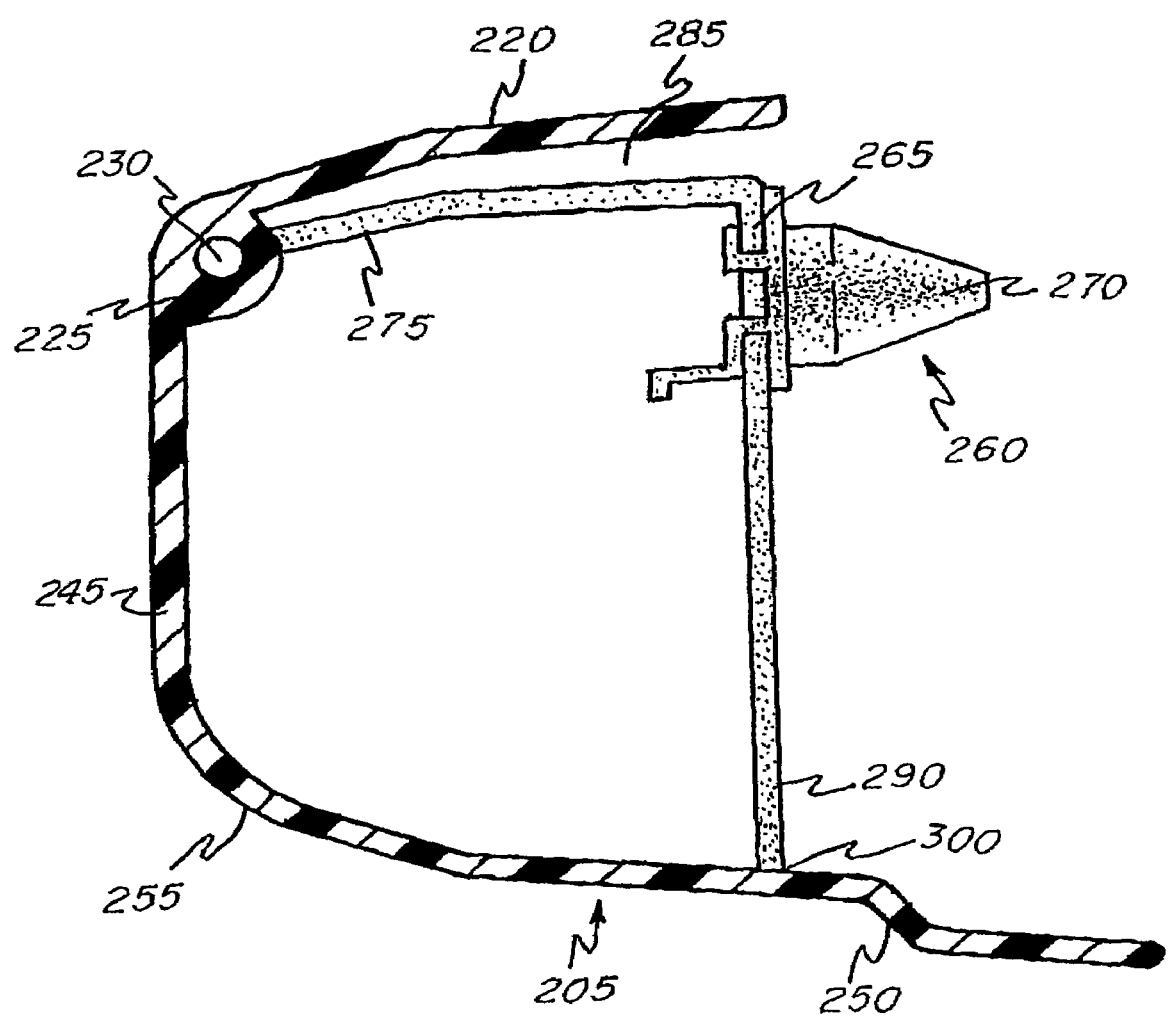
FIG. 2 is a transverse cross-sectional view of an elongated rocker panel and associated clip house in accordance with the invention.

The improved clip house rocker panel combination of the instant invention is shown in FIG. 2. Here, rocker panel 205 comprises a top member 220 connected to a side or skirt 245 at a first juncture 225 which is preferably in the form of an elongated rib or channel 230. Note that the show side of the part faces the lefthand side of the drawing.

The side portion of the automotive part is connected to the under surface 250 through a radiused section or second junction 255. As previously stated, manual or robotic labor typically handles this under surface in assembling the part to the automotive frame.

Clip house 260 comprises a generally planar attachment surface 265 through which a stud 270 or the like is received to fixedly connect the rocker panel to the frame (not shown) of an automobile or truck.

Top support 275 of the clip house is connected to the first juncture 225 at the location of the channel. An air space 285 is provided between the top side 220 of the rocker panel and the top support of the clip house. This helps to increase the flex of the top side 220.

Additionally, the second support 290 is attached to the elongated 250 at a location 300 that is laterally spaced from junction 255. This provides increased support to the surface 250 aiding in structural stability during attachment of the part to the frame.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. Combination comprising a plastic automotive part and a clip house member connected to said part, said clip house member being adapted to provide a mounting attachment to secure said automotive part to a corresponding mounting member of an automotive structural part, said plastic automotive part comprising a top show surface and a side show surface connected to said top show surface and extending away from said top show surface from a first juncture formed between said top show surface and said side show surface, said plastic automotive part further including an surface connected to said side show surface and extending away from said side show surface from a second juncture formed between said side show surface and said surface, said clip house comprising a first support member connected to said plastic automotive part at said first juncture and a second support member connected to said plastic automotive part along said surface at a location spaced from said second juncture.

2. Combination as recited in claim 1 wherein said first juncture comprises a rib with a channel formed therein.

3. Combination as recited in claim 2 wherein said top show surface is spaced above said first support member leaving an air space between said top show surface and said first support member.

4. Combination as recited in claim 3 wherein said mounting attachment comprises a generally planar attachment leg interconnecting said first and second support members.

* * * * *